United States Patent
Allgaier et al.

(10) Patent No.: US 10,860,189 B2
(45) Date of Patent: Dec. 8, 2020

(54) SYSTEMS AND METHODS FOR CUSTOMIZING SCALE AND CORRESPONDING VIEWS OF DATA DISPLAYS

(71) Applicant: Precision Planting LLC, Tremont, IL (US)

(72) Inventors: Ryan Allgaier, East Peoria, IL (US); David Aaron Wilcoxson, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 16/241,761

(22) Filed: Jan. 7, 2019

(65) Prior Publication Data

US 2019/0212902 A1    Jul. 11, 2019

Related U.S. Application Data

(60) Provisional application No. 62/616,052, filed on Jan. 11, 2018.

(51) Int. Cl.
| | | |
|---|---|---|
| *G06F 3/048* | (2013.01) | |
| *G06F 3/0484* | (2013.01) | |
| *G06T 19/20* | (2011.01) | |
| *G06F 3/0482* | (2013.01) | |
| *G06F 3/0485* | (2013.01) | |
| *A01B 79/00* | (2006.01) | |

(52) U.S. Cl.
CPC ........ *G06F 3/04845* (2013.01); *A01B 79/005* (2013.01); *G06F 3/0482* (2013.01); *G06F 3/0485* (2013.01); *G06T 19/20* (2013.01); *G06T 2219/2012* (2013.01); *G06T 2219/2016* (2013.01)

(58) Field of Classification Search
CPC .. G06F 3/04845; G06F 3/0482; G06F 3/0485; G06F 3/048; A01B 79/005; G06T 19/20; G06T 2219/2012; G06T 2219/2016
See application file for complete search history.

(56) References Cited

U.S. PATENT DOCUMENTS

2011/0022983 A1* 1/2011 Kim ............... G06F 3/0481
                                                      715/815
2013/0282423 A1 10/2013 Hori et al.
(Continued)

FOREIGN PATENT DOCUMENTS

| WO | 9821927 A1 | 5/1998 |
|---|---|---|
| WO | 2012094256 A1 | 7/2012 |

OTHER PUBLICATIONS

Extended European Search Report for EP19151080.9, dated May 16, 2019, 7 pages.

*Primary Examiner* — Jeanette J Parker

(57) ABSTRACT

Described herein are systems and methods for customizing scale and corresponding field views of agricultural fields with expand and panning operations. In one embodiment, a computer implemented method includes displaying a user interface having a scale region and a field region on a display device. The method further includes receiving, with the scale region, a user input to modify a scale of the scale region for a parameter and generating a modified scale region and also a corresponding modified field region based on the user input.

22 Claims, 5 Drawing Sheets

(56) References Cited

U.S. PATENT DOCUMENTS

| | | | |
|---|---|---|---|
| 2014/0002489 A1* | 1/2014 | Sauder | G06F 16/29 |
| | | | 345/629 |
| 2014/0249893 A1* | 9/2014 | McClure | G09B 29/007 |
| | | | 705/7.39 |
| 2014/0331631 A1* | 11/2014 | Sauder | A01D 45/021 |
| | | | 56/10.2 R |
| 2014/0365934 A1* | 12/2014 | Moore | G01C 21/3664 |
| | | | 715/769 |
| 2017/0337642 A1 | 11/2017 | Stuber et al. | |

* cited by examiner

SYSTEMS AND METHODS FOR CUSTOMIZING SCALE AND CORRESPONDING VIEWS OF DATA DISPLAYS

RELATED APPLICATIONS

This application claims the benefit of U.S. Provisional Application No. 62/616,052, filed on Jan. 11, 2018, the entire contents of which are hereby incorporated by reference.

TECHNICAL FIELD

Embodiments of the present disclosure relate to systems and methods for customizing scale and corresponding field views of data displays with expand and panning operations.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter.

A combine harvester or combine is a machine that harvests crops. A coverage map of a combine displays regions of the field that have been harvested by that combine. A coverage map allows the operator of the combine to know that a region of the field has already been harvested by the same combine. Yield data for a field can then be generated after harvesting the field. The yield data can be analyzed in order to potentially improve agricultural operations for a subsequent growing season.

BRIEF DESCRIPTION OF THE DRAWINGS

The present disclosure is illustrated by way of example, and not by way of limitation, in the figures of the accompanying drawings and in which.

DETAILED DESCRIPTION

Described herein are systems and methods for customizing scale and corresponding views of visualized data (such as from agricultural fields) with expand and panning operations. While illustrated with visualized data obtained from agricultural fields, the described expand and panning operations can be used with any visualized data. In one embodiment, a data processing system (e.g., cab, tractor, machine, apparatus, computing device, user device, drone, self-guided device, self-propelled device, etc) can generate and cause a display device to display a localized view map layer that is geographically associated with a selected region of a field map. The user can customize (e.g., change, expand, pan) a scale of a parameter for a sub region (e.g., scale region) of a user interface and a corresponding field view of an agricultural field of the user interface automatically changes in response to the customized change in order to have a customized view of the parameter being displayed in the field view. The user does not need to manually adjust the field view because this adjustment occurs automatically upon adjusting the scale region.

As used herein, expand can refer to both a positive expansion and a negative expansion (contraction).

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
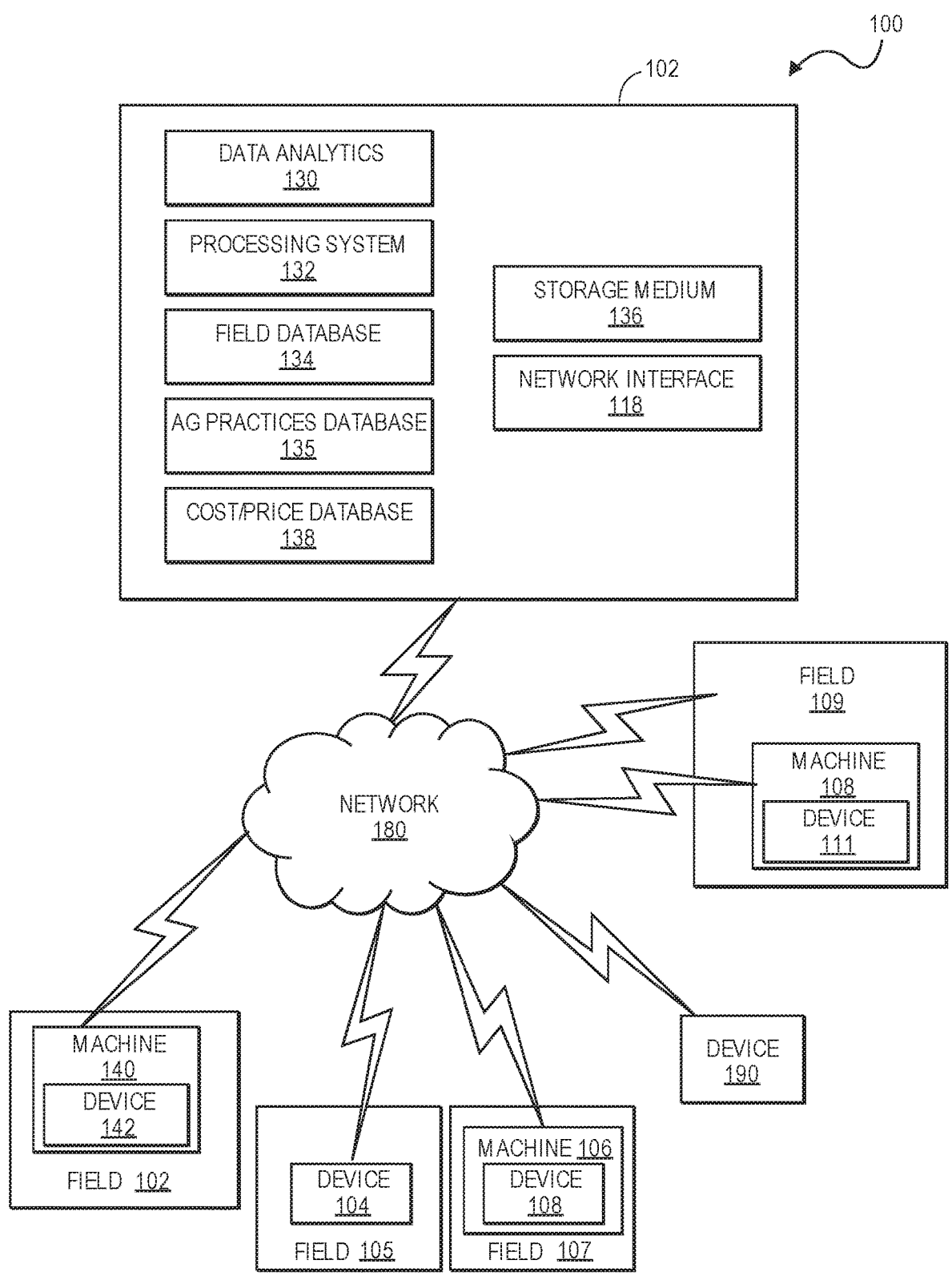
FIG. 1 shows an example of a system for collecting data of agricultural fields and performing analysis of the data of agricultural fields in accordance with one embodiment.

FIG. 1 shows an example of a system for collecting and analyzing agricultural data from agricultural fields in order to display customized agricultural data in accordance with one embodiment. For example and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. While illustrated with a monitor as the display device, the display device can by any display device, such as a monitor, a smartphone, a tablet, a personal computer, or any touch activated screen.

The system 100 (e.g., cloud based system) for collecting and analyzing agricultural data includes machines 140, 106, and 108 for performing field operations (e.g., tillage, planting, fertilization, harvesting, etc). The machines can include devices (e.g., devices 142, 108, 111) in addition to other devices 104 and 190 (e.g., user devices, mobile device, tablet devices, drones, etc) for displaying customized agricultural data based on expand and panning operations. The machines may also include sensors for capturing data of crops and soil conditions within associated fields (e.g., fields 102, 105, 107, 109). The system 100 includes an agricultural analysis system 102 and a storage medium 136 to store instructions, software, software programs, etc for execution by the processing system 102 and for performing operations of the agricultural analysis system 102. A data analytics module 130 may perform analytics on agricultural data (e.g., images, field, yield, etc.) to generate crop predictions 162 relating to agricultural operations. For example, the crop predictions may predict yield (e.g., crop yield) based on development of crops (e.g., yield potential or ear potential for corn) at different growth stages.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, fertilization information, planting population, applied nutrients (e.g., nitrogen), yield levels, proprietary indices (e.g., ratio of seed population to a soil parameter), etc.) for the fields that are being monitored by the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface includes one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for capturing images and performing analysis of the capturing images or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
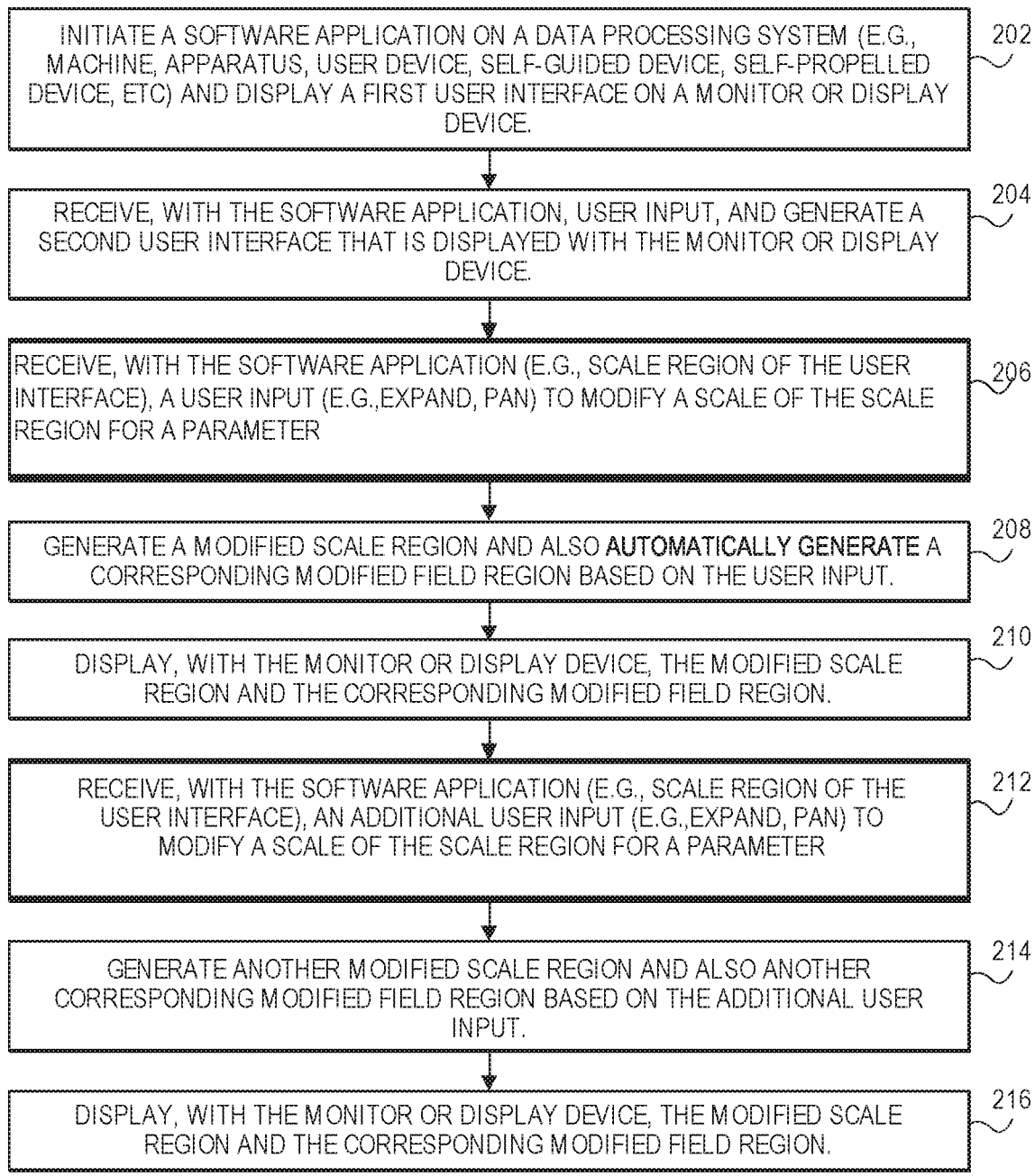
FIG. 2 illustrates a flow diagram of one embodiment for a method 200 of customizing scale and corresponding field views of agricultural fields with expand and panning operations.

FIG. 2 illustrates a flow diagram of one embodiment for a method 200 of customizing scale and corresponding field views of agricultural fields with expand and panning operations. The method 200 is performed by processing logic that may comprise hardware (circuitry, dedicated logic, etc.), software (such as is run on a general purpose computer system or a dedicated machine or a device), or a combination of both. In one embodiment, the method 200 is performed by processing logic of at least one data processing system (e.g., system 102, machine, apparatus, monitor, display device, user device, self-guided device, self-propelled device, etc). The data processing system executes instructions of a software application or program with processing logic. The software application or program can be initiated by the data processing system. In one example, a monitor or display device receives user input and provides a customized display for operations of the method 200.

At operation 202, a software application is initiated on a data processing system (e.g., system 102, machine, apparatus, user device, self-guided device, self-propelled device, etc) and displayed on a monitor or display device as a first user interface. The data processing system may be integrated with or coupled to a machine that performs an application pass (e.g., planting, tillage, fertilization). Alternatively, the data processing system may be integrated with an apparatus (e.g., drone, image capture device) associated with the machine that captures images during the application pass.

At operation 204, the software application receives user input, and generates a second user interface that is displayed with the monitor or display device. The second user interface is generated based on the user input and may include different display regions in one example including a seed population region, a singulation region, a down force region, a scale region for a parameter (e.g., vehicle speed, machine speed, down force, population, spacing, singulation, organic matter, temperature, or any measured property) of a field region, and the parameter for the field region. At operation 206, the software application (e.g., scale region of the user interface) receives a user input (e.g., touch user input for expand, panning operation; motion sensed user input; any type of user input for expand (positive expansion, negative expansion or contraction), panning operation) to modify a scale of the scale region for the parameter. In one example, the scale region is a smaller region and the field region is a larger region of the user interface.

At operation 208, the software application generates a modified scale region and also automatically generates a corresponding modified field region based on the user input. At operation 210, the monitor or display device displays the modified scale region and the corresponding modified field region.

At operation 212, the software application (e.g., scale region of the user interface) may optionally receive additional user input (e.g., expand (positive expansion, negative expansion or contraction), panning operation) to modify a scale of the scale region for the parameter.

At operation 214, the software application generates another modified scale region and also another modified field region based on the additional user input. At operation 216, the monitor or display device displays the modified scale region and the corresponding modified field region. The operations 212, 214, and 216 can be repeated if additional user input for modifying the scale region are received by the software application.

In some embodiments, the operations of the method(s) disclosed herein can be altered, modified, combined, or deleted. The methods in embodiments of the present disclosure may be performed with a device, an apparatus, or data processing system as described herein. The device, apparatus, or data processing system may be a conventional, general-purpose computer system or special purpose computers, which are designed or programmed to perform only one function, may also be used.

Figure 3A:
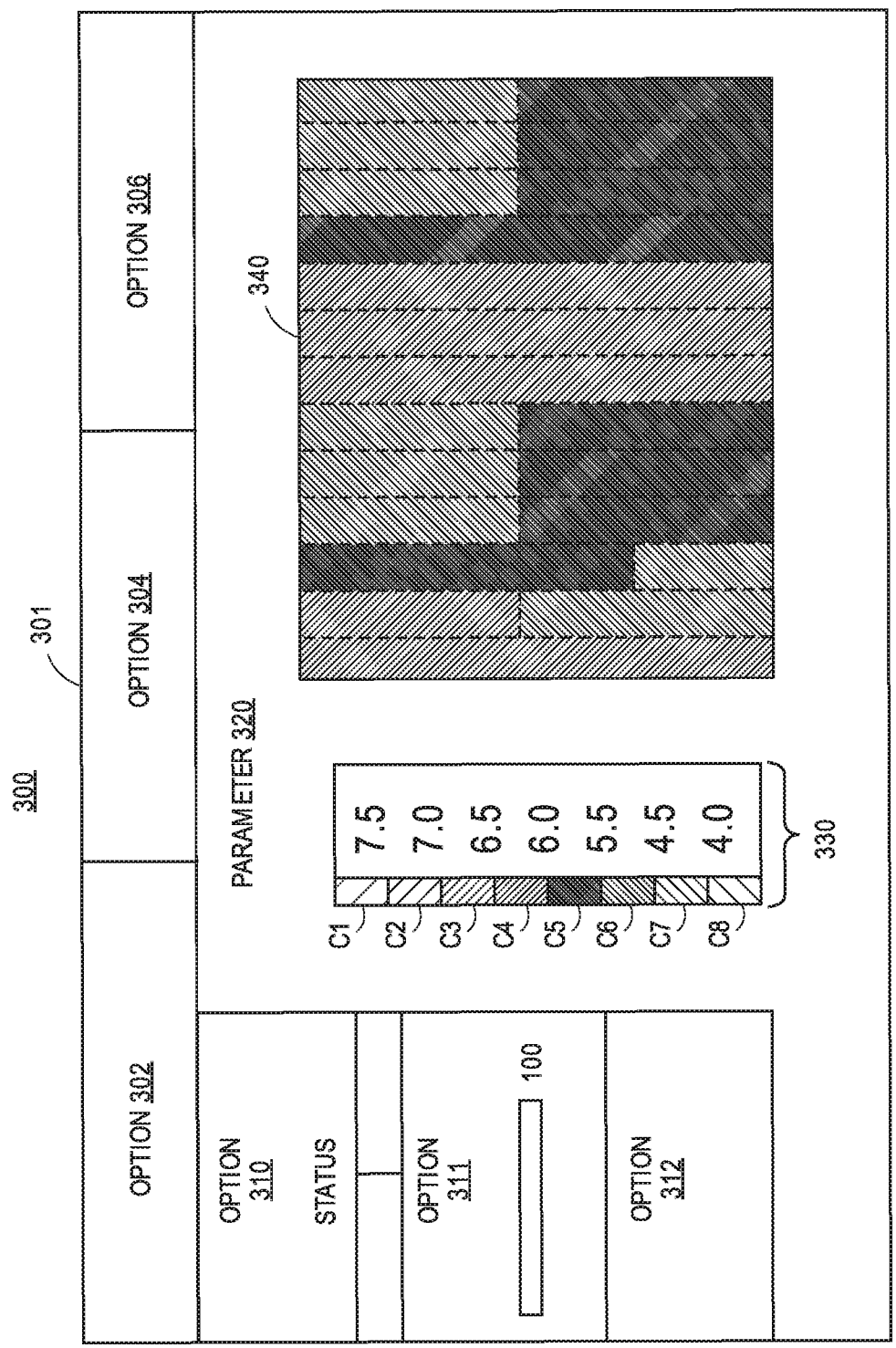
FIG. 3A illustrates a monitor or display device having a user interface 301 with customized scale and field regions in accordance with one embodiment.

FIG. 3A illustrates a monitor or display device having a user interface 301 with customized scale and field regions in accordance with one embodiment. An initiated software application (e.g., field application) of a data processing system generates the user interface 301 that is displayed by the monitor or display device 300.

The software application can provide different display regions that are selectable by a user. In one example, the display regions include a standard option 302, a metrics option 304, and a large map option 306 to control sizing of a displayed map in a field region. Also, in one example, the display regions include a seed population region having selectable option 310, a singulation region having selectable option 311, a down force region having selectable option 312, a selectable scale region 330 for a parameter 320 (e.g., vehicle speed, machine speed, down force, population, spacing, singulation, organic matter, temperature, or any measured property) of a field region 340, and the field region 340. The software application (e.g., touch sensitive scale region 330 of the user interface) may receive a user input (e.g., expand (positive expansion, negative expansion or contraction), panning operation) to modify a scale of the scale region for any parameter including the parameter 320.

Figure 3B:
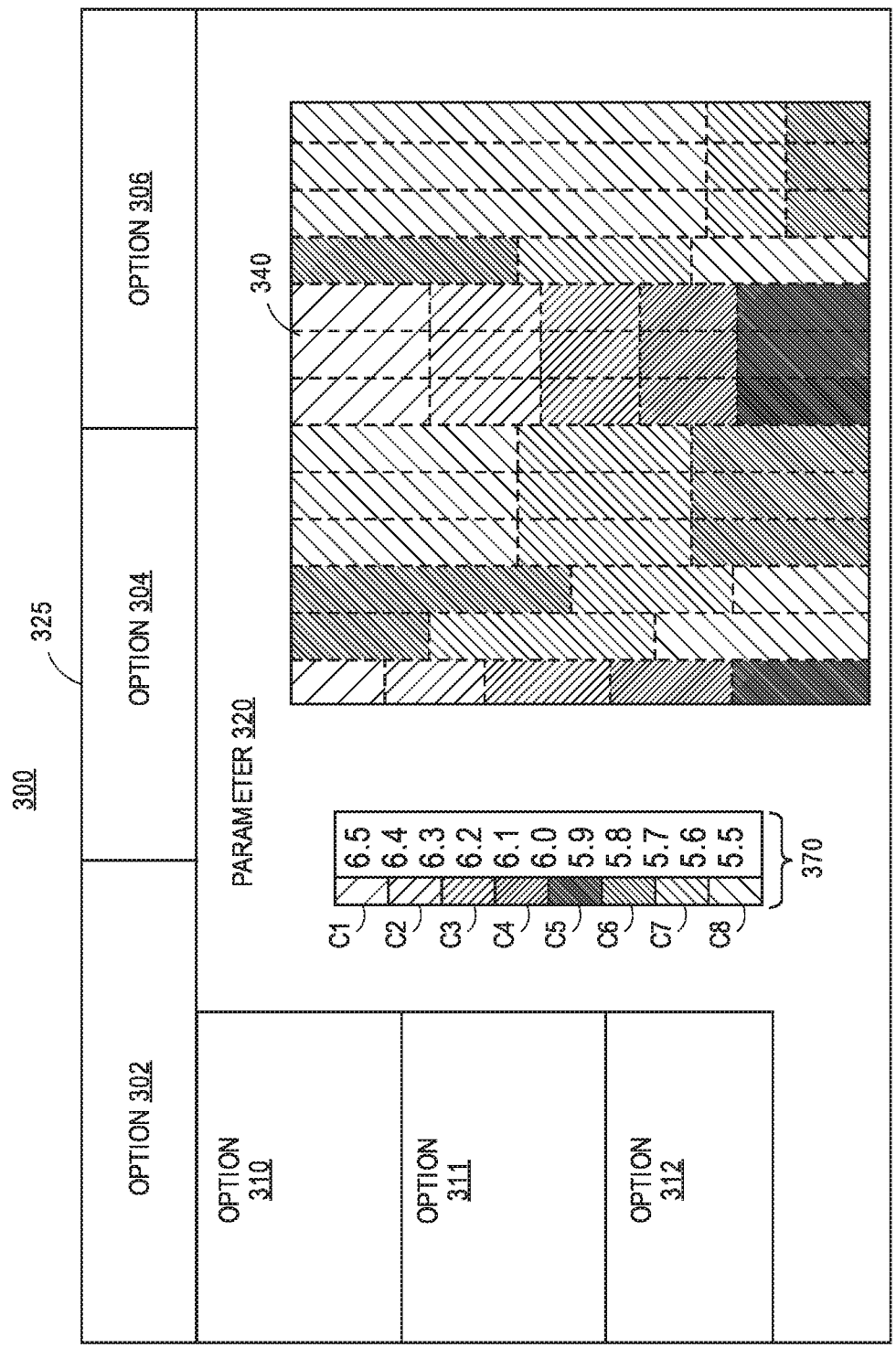
FIG. 3B illustrates a monitor or display device having a user interface 325 with customized scale and field regions in accordance with one embodiment.

In a first example, a first expand operation (e.g., pinch motion with 2 user input points contacting the scale region 330 and moving towards each other to expand in (or contract), e.g., 1 finger and 1 thumb or 2 fingers) causes a first scale region 330 having different colors (e.g., colors 1-8) and a first range of values (e.g., 4-7.5 mph) to expand in to a second scale region 370 of FIG. 3B having a smaller range of values of the scale region and a corresponding field region 380 changes from the first set of values (e.g., 4.0-7.5 mph) within the first scale region to a second set of values (e.g., 5.5-6.5 mph) within the second scale region. For example, if the user knows that the vehicle speed typically varies from 5.5-6.5 mph then the user may prefer to view the user interface 325 instead of the user interface 301. Alternatively, the user may prefer to view user interface 301 to view a wider range of parameter values.

In a second example, a second expand operation (e.g., expand with 2 user input points contacting the scale region 370 moving away from each other to expand out) causes the second scale region 370 to expand out to the first scale region (or alternatively fourth scale region) having a larger range of values of the scale region and a corresponding field region changes from the second set of values within the second scale region of FIG. 3B to the first set of values of the first scale region of FIG. 3A (or alternatively a fourth set of values within the fourth scale region).

In a third example, a first panning operation (e.g., panning with 1 user input point contacting the scale region 330 and moving upwards (or downwards), e.g. 1 finger or 1 thumb) causes the first scale region 330 to panning to a fifth scale having smaller values of the scale region and a corresponding field region changes from the first set of values within the first scale region to a fifth set of values within the fifth scale region. In this example, a first range (e.g., 7+4.5=2.5) for the first set of values is similar or the same as a range of the fifth set of values (e.g., 6+3.5=2.5).

In a fourth example, a second panning operation (e.g., panning with 1 user input point contacting scale region 330 and moving downwards (or upwards), e.g. 1 finger or 1 thumb) causes the first scale region 330 to panning to a sixth scale having larger values of the scale region and a corresponding field region changes from the first set of values within the first scale region to a sixth set of values within the sixth scale region.

Figure 4:
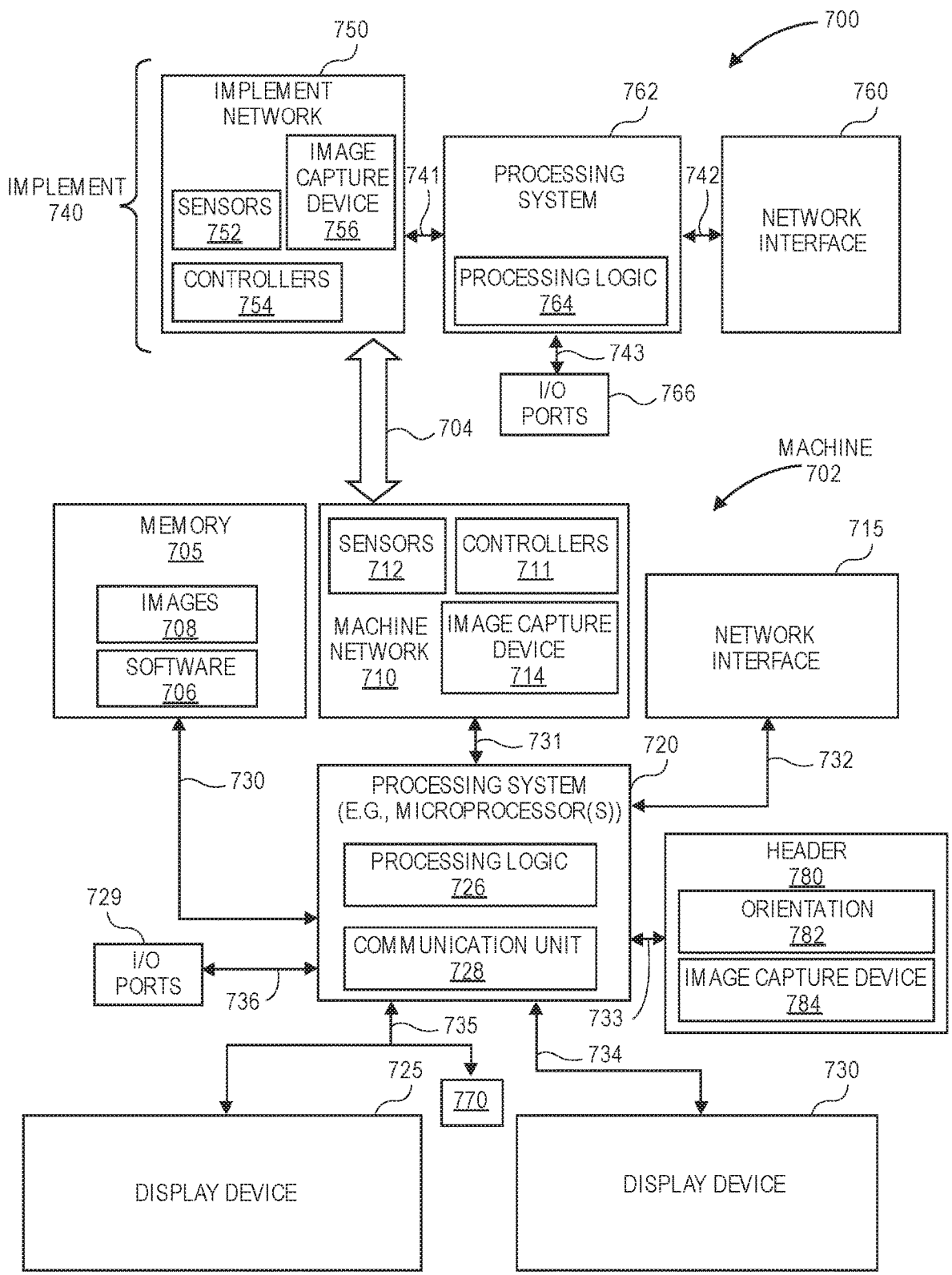
FIG. 4 shows an example of a system 700 that includes a machine 702 (e.g., tractor, combine harvester, etc.) and an implement 740 (e.g., planter, cultivator, plough, sprayer, spreader, irrigation implement, etc.) in accordance with one embodiment.

FIG. 4 shows an example of a system 700 that includes a machine 702 (e.g., tractor, combine harvester, etc.) and an implement 740 (e.g., planter, cultivator, plough, sprayer, spreader, irrigation implement, etc.) in accordance with one embodiment. The machine 702 includes a processing system 720, memory 705, machine network 710 (e.g., a controller area network (CAN) serial bus protocol network, an ISO-BUS network, etc.), and a network interface 715 for communicating with other systems or devices including the implement 740. The machine network 710 includes sensors 712 (e.g., speed sensors), controllers 711 (e.g., GPS receiver, radar unit) for controlling and monitoring operations of the machine, and an optional image capture device 714 for capturing images of crops and soil conditions of a field in accordance with embodiments of the present disclosure. The network interface 715 can include at least one of a GPS transceiver, a WLAN transceiver (e.g., WiFi), an infrared transceiver, a Bluetooth transceiver, Ethernet, or other interfaces from communications with other devices and systems including the implement 740. The network interface 715 may be integrated with the machine network 710 or separate from the machine network 710 as illustrated in FIG. 4. The I/O ports 729 (e.g., diagnostic/on board diagnostic (OBD) port) enable communication with another data processing system or device (e.g., display devices, sensors, etc.).

In one example, the machine performs operations of a combine (combine harvester) for harvesting grain crops. The machine combines reaping, threshing, and winnowing operations in a single harvesting operation. A header 780 (e.g., grain platform, flex platform) includes a cutting mechanism to cause cutting of crops to be positioned into an auger. The header 780 includes an orientation device 782 or mechanism for orienting a crop (e.g., corn, soybeans) for improving image capture with an image capture device 784.

The processing system 720 may include one or more microprocessors, processors, a system on a chip (integrated circuit), or one or more microcontrollers. The processing system includes processing logic 726 for executing software instructions of one or more programs and a communication unit 728 (e.g., transmitter, transceiver) for transmitting and receiving communications from the machine via machine network 710 or network interface 715 or implement via implement network 750 or network interface 760. The communication unit 728 may be integrated with the processing system or separate from the processing system. In one embodiment, the communication unit 728 is in data communication with the machine network 710 and implement network 750 via a diagnostic/OBD port of the I/O ports 729.

Processing logic 726 including one or more processors may process the communications received from the communication unit 728 including agricultural data. The system 700 includes memory 705 for storing data and programs for execution (software 706) by the processing system. The memory 705 can store, for example, software components such as image capture software, software for customizing scale and corresponding field views of agricultural fields with expand and panning operations for performing operations or methods of the present disclosure, or any other software application or module, images (e.g., captured images of crops), alerts, maps, etc. The memory 705 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 720 communicates bi-directionally with memory 705, machine network 710, network interface 715, header 780, display device 730, display device 725, and I/O ports 729 via communication links 730-736, respectively.

Display devices 725 and 730 can provide visual user interfaces for a user or operator. The display devices may include display controllers. In one embodiment, the display device 725 is a portable tablet device or computing device with a touchscreen that displays images (e.g., captured images, localized view map layer, high definition field maps of as-planted or as-harvested data or other agricultural variables or parameters, yield maps, alerts, etc.) and data generated by an agricultural data analysis software application or field view software application and receives input (e.g., expand (positive expansion, negative expansion or contraction), panning) from the user or operator for a customized scale region and corresponding view of a region of a field, monitoring and controlling field operations, or any operations or methods of the present disclosure. The operations may include configuration of the machine or implement, reporting of data, control of the machine or implement including sensors and controllers, and storage of the data generated. The display device 730 may be a display (e.g., display provided by an original equipment manufacturer (OEM)) that displays images and data for a localized view map layer, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 770 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 740 (e.g., planter, cultivator, plough, sprayer, spreader, irrigation implement, etc.) includes an implement network 750, a processing system 762, a network interface 760, and optional input/output ports 766 for communicating with other systems or devices including the machine 702. The implement network 750 (e.g., a controller area network (CAN) serial bus protocol network, an ISO-BUS network, etc.) includes an image capture device 756 for capturing images of crop development and soil conditions, sensors 752 (e.g., speed sensors, seed sensors for detecting passage of seed, downforce sensors, actuator valves, OEM sensors, etc.), controllers 754 (e.g., GPS receiver), and the processing system 762 for controlling and monitoring operations of the machine. The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process images captured by image capture device 756 or seed sensor data and transmit processed data to the processing system 762 or 720. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 760 can be a GPS transceiver, a WLAN transceiver (e.g., WiFi), an infrared transceiver, a Bluetooth transceiver, Ethernet, or other interfaces from communications with other devices and systems including the machine 702. The network interface 760 may be integrated with the implement network 750 or separate from the implement network 750 as illustrated in FIG. 1.

The processing system 762 communicates bi-directionally with the implement network 750, network interface 760, and I/O ports 766 via communication links 741-743, respectively.

The implement communicates with the machine via wired and possibly also wireless bi-directional communications 704. The implement network 750 may communicate directly with the machine network 710 or via the network interfaces 715 and 760. The implement may also by physically coupled to the machine for agricultural operations (e.g., planting, harvesting, spraying, etc.).

The memory 705 may be a machine-accessible non-transitory medium on which is stored one or more sets of instructions (e.g., software 706) embodying any one or more of the methodologies or functions described herein. The software 706 may also reside, completely or at least partially, within the memory 705 and/or within the processing system 720 during execution thereof by the system 700, the memory and the processing system also constituting machine-accessible storage media. The software 706 may further be transmitted or received over a network via the network interface device 715.

In one embodiment, a machine-accessible non-transitory medium (e.g., memory 705) contains executable computer program instructions which when executed by a data processing system cause the system to perform operations or methods of the present disclosure including customizing scale and corresponding field views of agricultural fields with expand and panning operations. While the machine-accessible non-transitory medium (e.g., memory 705) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Any of the following examples can be combined into a single embodiment or these examples can be separate embodiments. In one example of a first embodiment, a computer implemented method for customizing scale and corresponding field views of data displays comprises displaying a user interface having a scale region and a field region for a parameter on a display device; receiving, with the scale region, a user input to modify a scale of the scale region for the parameter; and generating a modified scale region and also automatically generating a corresponding modified field region based on the user input.

In another example of the first embodiment, the computer implemented method further comprises displaying, with the display device, the modified scale region and the corresponding modified field region.

In another example of the first embodiment, the user input to modify a scale of the scale region for a parameter comprises at least one of a expand in operation, a expand out operation, and a panning operation.

In another example of the first embodiment, the user input to modify a scale of the scale region for a parameter comprises at least one of a expand in operation, a expand out operation, and a panning operation.

In another example of the first embodiment, the user interface includes different display regions including one or more regions chosen from a seed population region, a singulation region, a down force region, the scale region for a parameter of a field region, and the parameter for the field region.

In another example of the first embodiment, the parameter comprises one or more items chosen from vehicle speed, machine speed, down force, population, spacing, singulation, organic matter, temperature, or any measured property.

In another example of the first embodiment, the user input to modify a scale of the scale region for a parameter comprises a expand in operation to cause the scale region having different colors and a first range of values to expand in to a smaller second range of values for the modified scale region and the corresponding field region automatically changes from a first set of values to a smaller second set of values for the modified field region.

In another example of the first embodiment, the user input to modify a scale of the scale region for a parameter comprises a expand out operation to cause the scale region having different colors and a first range of values to expand out to a larger second range of values for the modified scale region and the corresponding field region automatically changes from a first set of values to a larger second set of values for the modified field region.

In another example of the first embodiment, the user input to modify a scale of the scale region for a parameter comprises a panning operation to cause the scale region having different colors and a first range of values to pan to a different second range of values for the modified scale region and the corresponding field region automatically changes from a first set of values to a lower second set of values for the modified field region.

In another example of the first embodiment, the user input to modify a scale of the scale region for a parameter comprises a panning operation to cause the scale region having different colors and a first range of values to pan to a different second range of values for the modified scale region and the corresponding field region automatically changes from a first set of values to a higher second set of values for the modified field region.

In one example of the second embodiment, a computing device comprises a display device for displaying a user interface having a scale region and a field region for a parameter and at least one processor coupled to the display device, the at least one processor is configured to execution instructions to receive a modification of a scale of the scale region for the parameter, to generate a modified scale region, and also to automatically generate a corresponding modified field region.

In another example of the second embodiment, the display device to display the modified scale region and the corresponding modified field region.

In another example of the second embodiment, the modification of the scale of the scale region for a parameter comprises at least one of a expand in operation, a expand out operation, and a panning operation.

In another example of the second embodiment, the user interface includes different display regions including one or more regions chosen from a seed population region, a singulation region, a down force region, the scale region for a parameter of a field region, and the parameter for the field region.

In another example of the second embodiment, the parameter comprises one or more items chosen from vehicle speed, machine speed, down force, population, spacing, singulation, organic matter, temperature, or any measured property.

In another example of the second embodiment, the modification to modify a scale of the scale region for a parameter comprises a expand in operation to cause the scale region having different colors and a first range of values to expand in to a smaller second range of values for the modified scale region and the corresponding field region automatically changes from a first set of values to a smaller second set of values for the modified field region.

In another example of the second embodiment, the modification to modify a scale of the scale region for a parameter comprises a expand out operation to cause the scale region having different colors and a first range of values to expand out to a larger second range of values for the modified scale region and the corresponding field region automatically changes from a first set of values to a larger second set of values for the modified field region.

In another example of the second embodiment, the modification to modify a scale of the scale region for a parameter comprises a panning operation to cause the scale region having different colors and a first range of values to pan to a different second range of values for the modified scale region and the corresponding field region automatically changes from a first set of values to a lower second set of values for the modified field region.

In another example of the second embodiment, the modification to modify a scale of the scale region for a parameter comprises a panning operation to cause the scale region having different colors and a first range of values to pan to a different second range of values for the modified scale region and the corresponding field region automatically changes from a first set of values to a higher second set of values for the modified field region.

In one example of a third embodiment, computer implemented method for customizing scale of a scale region and corresponding field views of a field region of data displays comprises receiving, with the scale region of a user interface, a first input to modify a scale of the scale region for a parameter and generating a first modified scale region and also automatically generating a corresponding first modified field region based on the first input.

In another example of the third embodiment, the method further comprises displaying, with the display device, the first modified scale region and the corresponding first modified field region.

In another example of the third embodiment, the first input to modify a scale of the scale region for the parameter comprises at least one of a expand in operation, a expand out operation, and a panning operation.

In another example of the third embodiment, the user interface includes different display regions including one or more regions chosen from a seed population region, a singulation region, a down force region, the scale region for a parameter of a field region, and the parameter for the field region.

In another example of the third embodiment, the parameter comprises one or more items chosen from vehicle speed, machine speed, down force, population, spacing, singulation, organic matter, temperature, or any measured property.

In another example of the third embodiment, the method further comprises receiving, with the scale region, a second input to modify a scale of the scale region for the parameter and generating a second modified scale region and also automatically generating a corresponding second modified field region based on the second input.

In another example of the third embodiment, the method further comprises displaying, with the display device, the second modified scale region and the corresponding second modified field region.

In another example of the third embodiment, the second user input to modify the scale of the scale region for the parameter comprises at least one of a expand in operation, a expand out operation, and a panning operation.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer implemented method for customizing scale and corresponding field views of data displays comprising:
    displaying a user interface having a scale region and a field region for a parameter on a display device;
    receiving, on the scale region, a user input to modify a range of scale of the scale region for the parameter; and
    generating a modified scale region having a modified range of scale for the parameter and also automatically generating a corresponding modified field region based on the user input,
    wherein the user input to modify the range values of the scale of the scale region for a parameter comprises at least one of expand in operation with two input points contacting the scale region and moving towards each other to expand in or an expand out operation with two input points contacting the scale region and moving away from each other to expand out.

2. The computer implemented method of claim 1, further comprising:
    displaying, with the display device, the modified scale region and the corresponding modified field region.

3. The computer implemented method of claim 1, wherein the user interface includes different display regions including one or more regions chosen from a seed population region, a singulation region, a down force region, the scale region for a parameter of a field region, and the parameter for the field region.

4. The computer implemented method of claim 3, wherein the parameter comprises one or more items chosen from vehicle speed, machine speed, down force, population, spacing, singulation, organic matter, temperature, or any measured property.

5. A computer implemented method for customizing scale and corresponding field views of data displays comprising:
    displaying a user interface having a scale region and a field region for a parameter on a display device;
    receiving, on the scale region, a user input to modify a range of a scale of the scale region for the parameter; and
    generating a modified scale region having a modified range of the scale for the parameter and also automatically generating a corresponding modified field region based on the user input,
    wherein the user input to modify the range of the scale of the scale region for a parameter comprises an expand in operation with two input points contacting the scale region and moving towards each other to expand in to cause the scale region having different colors and a first range of values to expand into a smaller second range of values for the modified scale region and the corresponding field region automatically changes from a first set of values to a smaller second set of values for the modified field region.

6. A computer implemented method for customizing scale and corresponding field views of data displays comprising:
    displaying a user interface having a scale region and a field region for a parameter on a display device;
    receiving, on the scale region, a user input to modify a range of a scale of the scale region for the parameter; and
    generating a modified scale region having a modified range of the scale for the parameter and also automatically generating a corresponding modified field region based on the user input,
    wherein the user input to modify the range of the scale of the scale region for a parameter comprises an expand out operation with two input points contacting the scale region and moving away from each other to expand out to cause the scale region having different colors and a first range of values to expand out to a larger second range of values for the modified scale region and the corresponding field region automatically changes from a first set of values to a larger second set of values for the modified field region.

7. A computer implemented method for customizing scale and corresponding field views of data displays comprising:
    displaying a user interface having a scale region and a field region for a parameter on a display device;
    receiving, on the scale region, a user input to modify a range of a scale of the scale region for the parameter; and
    generating a modified scale region having a modified range of the scale for the parameter and also automatically generating a corresponding modified field region based on the user input,
    wherein the user input to modify the range of the scale of the scale region for a parameter comprises a panning operation to cause the scale region having different colors and a first range of values to pan to a different second range of values for the modified scale region and the corresponding field region automatically changes from a first set of values to a lower second set of values for the modified field region.

8. A computer implemented method for customizing scale and corresponding field views of data displays comprising:
    displaying a user interface having a scale region and a field region for a parameter on a display device;
    receiving, on the scale region, a user input to modify a range of a scale of the scale region for the parameter; and
    generating a modified scale region having a modified range of the scale for the parameter and also automatically generating a corresponding modified field region based on the user input,
    wherein the user input to modify the range of the scale of the scale region for a parameter comprises a panning operation to cause the scale region having different colors and a first range of values to pan to a different second range of values for the modified scale region and the corresponding field region automatically changes from a first set of values to a higher second set of values for the modified field region.

9. A computing device comprising:
a display device for displaying a user interface having a scale region and a field region for a parameter; and
at least one processor coupled to the display device, the at least one processor is configured to execution instructions to
receive, on the scale region, a user input to modify a range of a scale of the scale region for the parameter, to generate a modified scale region having a modified range of the scale for the parameter, and also to automatically generate a corresponding modified field region,
wherein the user input to modify the range of values of the scale of the scale region for a parameter comprises at least one of an expand in operation with two input points contacting the scale region and moving towards each other to expand in or an expand out operation with two input points contacting the scale region and moving away from each other to expand out.

10. The computing device of claim 9, wherein the display device to display the modified scale region and the corresponding modified field region.

11. The computing device of claim 9, wherein the user interface includes different display regions including one or more regions chosen from a seed population region, a singulation region, a down force region, the scale region for a parameter of a field region, and the parameter for the field region.

12. The computing device of claim 11, wherein the parameter comprises one or more items chosen from vehicle speed, machine speed, down force, population, spacing, singulation, organic matter, temperature, or any measured property.

13. A computing device comprising:
a display device for displaying a user interface having a scale region and a field region for a parameter; and
at least one processor coupled to the display device, the at least one processor is configured to execution instructions to receive, on the scale region, a user input to modify a range of a scale of the scale region for the parameter, to generate a modified scale region having a modified range of the scale for the parameter, and also to automatically generate a corresponding modified field region,
wherein the modification to modify the range of the scale of the scale region for a parameter comprises an expand in operation with two input points contacting the scale region and moving towards each other to expand in to cause the scale region having different colors and a first range of values to expand in to a smaller second range of values for the modified scale region and the corresponding field region automatically changes from a first set of values to a smaller second set of values for the modified field region.

14. A computing device comprising:
a display device for displaying a user interface having a scale region and a field region for a parameter; and
at least one processor coupled to the display device, the at least one processor is configured to execution instructions to receive, on the scale region, a user input to modify a range of a scale of the scale region for the parameter, to generate a modified scale region having a modified range of the scale for the parameter, and also to automatically generate a corresponding modified field region,
wherein the modification to modify the range of the scale of the scale region for a parameter comprises an expand out operation with two input points contacting the scale region and moving away from each other to expand out to cause the scale region having different colors and a first range of values to expand out to a larger second range of values for the modified scale region and the corresponding field region automatically changes from a first set of values to a larger second set of values for the modified field region.

15. A computing device comprising:
a display device for displaying a user interface having a scale region and a field region for a parameter; and
at least one processor coupled to the display device, the at least one processor is configured to execution instructions to receive, on the scale region, a user input to modify a range of a scale of the scale region for the parameter, to generate a modified scale region having a modified range of the scale for the parameter, and also to automatically generate a corresponding modified field region,
wherein the modification to modify the range of the scale of the scale region for a parameter comprises a panning operation to cause the scale region having different colors and a first range of values to pan to a different second range of values for the modified scale region and the corresponding field region automatically changes from a first set of values to a lower second set of values for the modified field region.

16. A computing device comprising:
a display device for displaying a user interface having a scale region and a field region for a parameter; and
at least one processor coupled to the display device, the at least one processor is configured to execution instructions to receive, on the scale region, a user input to modify a range of a scale of the scale region for the parameter, to generate a modified scale region having a modified range of the scale for the parameter, and also to automatically generate a corresponding modified field region,
wherein the modification to modify the range of the scale of the scale region for a parameter comprises a panning operation to cause the scale region having different colors and a first range of values to pan to a different second range of values for the modified scale region and the corresponding field region automatically changes from a first set of values to a higher second set of values for the modified field region.

17. A computer implemented method for customizing scale of a scale region and corresponding field views of a field region of data displays comprising:
receiving, on the scale region of a user interface, a first input to modify range of a scale of the scale region for a parameter; and
generating a first modified scale region having a modified range of scale for the parameter and also automatically generating a corresponding first modified field region based on the first input,
wherein the first input to modify the range of values of the scale of the scale region for a parameter comprises at least one of an expand in operation with two input points contacting the scale region and moving towards each other to expand in or an expand out operation with two input points contacting the scale region and moving away from each other to expand out.

18. The computer implemented method of claim 17, wherein the user interface includes different display regions including one or more regions chosen from a seed population region, a singulation region, a down force region, the scale region for a parameter of a field region, and the parameter for the field region.

19. The computer implemented method of claim 18, wherein the parameter comprises one or more items chosen from vehicle speed, machine speed, down force, population, spacing, singulation, organic matter, temperature, or any measured property.

20. The computer implemented method of claim 17, further comprising:
   receiving, with the scale region, a second input to modify a scale of the scale region for the parameter; and
   generating a second modified scale region and also automatically generating a corresponding second modified field region based on the second input.

21. The computer implemented method of claim 20, further comprising:
   displaying, with the display device, the second modified scale region and the corresponding second modified field region.

22. The computer implemented method of claim 21, wherein the second input to modify the scale of the scale region for the parameter comprises at least one of an expand in operation, an expand out operation, and a panning operation.

\* \* \* \* \*